US009093078B2

(12) United States Patent
Hacihabiboglu et al.

(10) Patent No.: US 9,093,078 B2
(45) Date of Patent: Jul. 28, 2015

(54) ACOUSTIC SOURCE SEPARATION

(75) Inventors: Banu Gunel Hacihabiboglu, Surrey (GB); Huseyin Hacihabiboglu, Surrey (GB); Ahmet Kondoz, Surrey (GB)

(73) Assignee: The University of Surrey, Guildford, Surrey (GB)

( * ) Notice: Subject to any disclaimer, the term of this patent is extended or adjusted under 35 U.S.C. 154(b) by 432 days.

(21) Appl. No.: 12/734,195

(22) PCT Filed: Oct. 17, 2008

(86) PCT No.: PCT/GB2008/003538

§ 371 (c)(1),
(2), (4) Date: Sep. 14, 2010

(87) PCT Pub. No.: WO2009/050487

PCT Pub. Date: Apr. 23, 2009

(65) Prior Publication Data

US 2011/0015924 A1 Jan. 20, 2011

(30) Foreign Application Priority Data

Oct. 19, 2007 (GB) .................................. 0720473.8

(51) Int. Cl.
*H04B 15/00* (2006.01)
*G10L 21/0272* (2013.01)
(Continued)

(52) U.S. Cl.
CPC ............ *G10L 21/0272* (2013.01); *H04R 3/005* (2013.01); *H04R 1/1083* (2013.01); *H04R 2225/43* (2013.01); *H04S 2400/15* (2013.01)

(58) Field of Classification Search
CPC ............ G10L 21/0272; G10L 21/0232; G10L 21/028; G06K 9/624; G06K 9/6242; H04R 3/005; H04R 1/1083; H04R 2225/43; H04R 1/04; H04R 1/08; H04R 1/406; H04R 2201/401; H04R 2201/405; H04R 2430/00; H04R 2430/20; H04R 25/405; H04S 2400/15
USPC ............ 381/94.2, 92, 56, 57, 94.1–94.4, 119; 704/231; 700/94
See application file for complete search history.

(56) References Cited

U.S. PATENT DOCUMENTS 2,284,749 A * 6/1942 Reiskind et al. .............. 369/107
3,159,807 A * 12/1964 Asbury, Sr. ................... 367/120
(Continued)

FOREIGN PATENT DOCUMENTS

JP 2007129373 5/2007
WO WO 99/52211 A 10/1999
(Continued)

OTHER PUBLICATIONS

Mitianoudis N. et al: "Batch and Online Underdetermined Source Separation Using Laplacian Mixture Models" IEEE Transactions on Audio, Speech, and Language Processing, IEEE Service Center, New York, NY, US, vol. 15, No. 6, Aug. 1, 2007, pp. 1818-1832, XP011187715 ISSN: 1558-7916.*
(Continued)

*Primary Examiner* — Lun-See Lao
(74) *Attorney, Agent, or Firm* — Wegman, Hessler & Vanderburg

(57) ABSTRACT

A method of separating a mixture of acoustic signals from a plurality of sources comprises: providing pressure signals indicative of time-varying acoustic pressure in the mixture; defining a series of time windows; and for each time window: a) providing from the pressure signals a series of sample values of measured directional pressure gradient; b) identifying different frequency components of the pressure signals c) for each frequency component defining an associated direction; and d) from the frequency components and their associated directions generating a separated signal for one of the sources.

16 Claims, 11 Drawing Sheets

(51) Int. Cl.
*H04R 3/00* (2006.01)
*H04R 1/10* (2006.01)

(56) References Cited

U.S. PATENT DOCUMENTS

| | | | | | |
|---|---|---|---|---|---|
| 3,704,931 | A * | 12/1972 | Mueller | ........ | 359/9 |
| 4,042,779 | A * | 8/1977 | Craven et al. | ........ | 381/103 |
| 4,333,170 | A * | 6/1982 | Mathews et al. | ........ | 367/125 |
| 4,730,282 | A * | 3/1988 | Jaeger et al. | ........ | 367/124 |
| 6,009,396 | A * | 12/1999 | Nagata | ........ | 704/270 |
| 6,225,948 | B1 * | 5/2001 | Baier et al. | ........ | 342/417 |
| 6,260,013 | B1 * | 7/2001 | Sejnoha | ........ | 704/240 |
| 6,317,703 | B1 * | 11/2001 | Linsker | ........ | 702/190 |
| 6,603,861 | B1 * | 8/2003 | Maisano et al. | ........ | 381/92 |
| 6,625,587 | B1 * | 9/2003 | Erten et al. | ........ | 706/22 |
| 6,862,541 | B2 * | 3/2005 | Mizushima | ........ | 702/76 |
| 7,039,546 | B2 * | 5/2006 | Sawada et al. | ........ | 702/150 |
| 7,076,433 | B2 * | 7/2006 | Ito et al. | ........ | 704/500 |
| 7,146,014 | B2 * | 12/2006 | Hannah | ........ | 381/92 |
| 7,295,972 | B2 * | 11/2007 | Choi | ........ | 704/226 |
| 7,860,134 | B2 * | 12/2010 | Spence et al. | ........ | 370/536 |
| 7,885,688 | B2 * | 2/2011 | Thornton et al. | ........ | 455/562.1 |
| 2001/0037195 | A1 * | 11/2001 | Acero et al. | ........ | 704/200 |
| 2003/0112983 | A1 * | 6/2003 | Rosca et al. | ........ | 381/103 |
| 2003/0138116 | A1 * | 7/2003 | Jones et al. | ........ | 381/94.1 |
| 2003/0199857 | A1 * | 10/2003 | Eizenhofer | ........ | 606/2.5 |
| 2005/0240642 | A1 * | 10/2005 | Parra et al. | ........ | 708/400 |
| 2006/0025989 | A1 * | 2/2006 | Mesgarani et al. | ........ | 704/200 |
| 2006/0153059 | A1 * | 7/2006 | Spence et al. | ........ | 370/203 |
| 2006/0206315 | A1 * | 9/2006 | Hiroe et al. | ........ | 704/203 |
| 2007/0160230 | A1 * | 7/2007 | Nakagomi | ........ | 381/97 |

FOREIGN PATENT DOCUMENTS

| | | | | | |
|---|---|---|---|---|---|
| WO | WO 9952211 | A1 * | 10/1999 | ............ | H03H 21/00 |
| WO | WO 03/015459 | A2 | 2/2003 | | |

OTHER PUBLICATIONS

Princen, J.P., et al., "Analysis/Synthesis Filter Bank Design Based on Time Domain Aliasing Cancellation", IEEE Trans. Acoustic, Speech, Signal Process., vol. 34, No. 5, Oct. 1986, pp. 1153-1161.

Fahy, F.J. Sound Intensity, 2nd ed. London: E&FN SPON, 1995, pp. 108-121.

De Bree, H.E., et al., "Three Dimensional Sound Intensity Measurements Using Microflown Particle Velocity Sensors", In Proc. 12th IEEE Intl. Conf. on Micro Electro Mech. Syst., Orlando, FL, USA, Jan. 1999, pp. 124-129.

Sanchis, J.S. et al., "Computational Cost Reduction Using Coincident Boundary Microphones for Convolutive Blind Signal Separation", Electronics Letters, vol. 41, No. 6, Mar. 2005.

Merimaa, J., et al., "Spatial Impulse Response Rendering I: Analysis and Synthesis," Journal of the Audio Engineering Society, Audio Engineering Society, NY, NY, US, vol. 53, No. 12, Dec. 2005, pp. 1115-1127.

Gunel, B., et al., "Wavelet-Packet Based Passive Analysis of Sound Fields Using a Coincident Microphone Array," Appied Acoustics, vol. 68, No. 7, Jul. 2007, pp. 778-796.

Mitianoudis, N., et al., "Batch and Online Underdetermined Source Separation Using Laplacian Mixture Models", IEEE Transactions on Audio, Speech, and Language Processing, IEEE Service Center, NY, NY, US, vol. 15, No. 6, Aug. 2007, pp. 1818-1832.

Mitianoudis, N., et al., "Underdetermined Source Separation Using Mixtures of Warped Laplacians", Independent Component Analysis and Signal Separation [Lecture notes in computer science], Springer Berlin Heidelberg, Berlin Heidelberg, vol. 4666, No. 9, Sep. 2007, pp. 236-243.

Gunel, B., et al., "Acoustic Source Separation of Convolutive Mixtures Based on Intensity Vector Statistics", IEEE Transactions on Audio, Speech, and Language Processing, IEEE Service Center, NY, NY, US, vol. 16, No. 4, May 1, 2008, pp. 748-756.

* cited by examiner

Normalised Amplitude
Time (s)
1
0
−1
0
1
2

ACOUSTIC SOURCE SEPARATION

FIELD OF THE INVENTION

The present invention relates to the processing of acoustic signals, and in particular to the separation of a mixture of sounds from different sound sources.

BACKGROUND TO THE INVENTION

The separation of convolutive mixtures aims to estimate the individual sound signals in the presence of other such signals in reverberant environments. As sound mixtures are almost always convolutive in enclosures, their separation is a useful pre-processing stage for speech recognition and speaker identification problems. Other direct application areas also exist such as in hearing aids, teleconferencing, multichannel audio and acoustical surveillance. Several techniques have been proposed before for the separation of convolutive mixtures, which can be grouped into three different categories: stochastic, adaptive and deterministic.

Stochastic methods, such as the independent component analysis (ICA), are based on a separation criterion that assumes the statistical independence of the source signals. ICA was originally proposed for instantaneous mixtures. It is applied in the frequency domain for convolutive mixtures, as the convolution corresponds to multiplication in the frequency domain. Although faster implementations exist such as the FastICA, stochastic methods are usually computationally expensive due to the several iterations required for the computation of the demixing filters. Furthermore, frequency domain ICA-based techniques suffer from the scaling and permutation issues resulting from the independent application of the separation algorithms in each frequency bin.

The second group of methods are based on adaptive algorithms that optimize a multichannel filter structure according to the signal properties. Depending on the type of the microphone array used, adaptive beamforming (ABF) utilizes spatial selectivity to improve the capture of the target source while suppressing the interferences from other sources. These adaptive algorithms are similar to stochastic methods in the sense that they both depend on the properties of the signals to reach a solution. It has been shown that the frequency domain adaptive beamforming is equivalent to the frequency domain blind source separation (BSS). These algorithms need to adaptively converge to a solution which may be suboptimal. They also need to tackle with all the targets and interferences jointly. Furthermore, the null beamforming applied for the interference signal is not very effective under reverberant conditions due to the reflections, creating an upper bound for the performance of the BSS.

Deterministic methods, on the other hand, do not make any assumptions about the source signals and depend solely on the deterministic aspects of the problem such as the source directions and the multipath characteristics of the reverberant environment. Although there have been efforts to exploit direction-of-arrival (DOA) information and the channel characteristics for solving the permutation problem, these were used in an indirect way, merely to assist the actual separation algorithm, which was usually stochastic or adaptive.

A deterministic approach that leads to a closed-form solution is very desirable from the computational point of view. However, no such method with satisfactory performance has been proposed so far. There are two reasons for this. Firstly, the knowledge of the source directions is not sufficient for good separation, because without adaptive algorithms, the source directions can be exploited only by simple delay-and-sum beamformers. However, due to the limited number of microphones in an array, the spatial selectivity of such beamformers is not sufficient to perform well under reverberant conditions. Secondly, the multipath characteristics of the environment can not be found with sufficient accuracy while using non-coincident arrays, as the channel characteristics are different at each sensor position which in turn makes it difficult to determine the room responses from the mixtures.

Almost all of the source separation methods employ non-coincident microphone arrays to the extent that the existence of such an array geometry is an inherent assumption by default in the formulation of the problem. The use of a coincident microphone array was previously proposed to exploit the directivities of two closely positioned directional microphones (J. M. Sanchis and J. J. Rieta, "Computational Cost Reduction using coincident boundary microphones for convolutive blind signal separation"*Electronics Lett*., vol. 41, no. 6 pp. 374-376 March 2005). However, the construction of the solution disregarded the fact that the reflections are weighted with different directivity factors according to their arrival directions for two directional microphones pointing at different angles. Therefore, the method was, in fact, not suitable for convolutive mixtures. In literature, coincident microphone arrays have been investigated mostly for intensity vector calculations and sound source localization (H. E. de Bree, W. F. Druyvesteyn, E. Berenschot, and M. Elwenspoek, "Three dimensional sound intensity measurements using Microflown particle velocity sensors", in Proc. $12^{th}$ IEEE Int. Conf. on Micro Electro Mech. Syst., Orlando, Fla., USA, January 1999, pp. 124-129; J. Merimaa and V. Pulkki, "Spatial impulse response rendering I: Analysis and synthesis," J. Audio Eng. Soc., vol. 53, no. 12, pp. 1115-1127, December 2005; B. Gunel, H. Hacihabiboglu, and A. M. Kondoz, "Wavelet-packet based passive analysis of sound fields using a coincident microphone array," Appl. Acoust., vol. 68, no. 7, pp. 778-796, July 2007).

SUMMARY TO THE INVENTION

The present invention provides a technique that can be used to provide a closed form solution for the separation of convolutive mixtures captured by a compact, coincident microphone array. The technique may depend on the channel characterization in the frequency domain based on the analysis of the intensity vector statistics. This can avoid the permutation problem which normally occurs due to the lack of channel modeling in the frequency domain methods.

Accordingly the present invention provides a method of separating a mixture of acoustic signals from a plurality of sources, the method comprising any one or more of the following:

providing pressure signals indicative of time-varying acoustic pressure in the mixture;

defining a series of time windows; and for each time window:

a) generating from the pressure signals a series of sample values of measured directional pressure gradient;

b) identifying different frequency components of the pressure signals;

c) for each frequency component defining an associated direction;

d) from the frequency components and their associated directions generating a separated signal for one of the sources.

The separation may be performed in two dimensions, or three dimensions.

The method may include generating the pressure signals, or may be performed on pressure signals which have already been obtained The method may include defining from the pressure signals a series of values of a pressure function. The directionality function may be applied to the pressure function to generate the separated signal for the source. For example, the pressure function may be, or be derived from, one or more of the pressure signals, which may be generated from one or more omnidirectional pressure sensors, or the pressure function may be, or be derived from, one or more pressure gradients.

The separated signal may be an electrical signal. The separated signal may define an associated acoustic signal. The separated signal may be used to generate a corresponding acoustic signal.

The associated direction may be determined from the pressure gradient sample values.

The directions of the frequency components may be combined to form a probability distribution from which the directionality function is obtained.

The directionality function may be obtained by modelling the probability distribution so as to include a set of source components each comprising a probability distribution from a single source.

The probability distribution may be modelled so as also to include a uniform density component.

The source components may be estimated numerically from the measured intensity vector direction distribution.

Each of the source components may have a beamwidth and a direction, each of which may be selected from a set of discrete possible values.

The directionality function may define a weighting factor which varies as a function of direction, and which is applied to each frequency component of the omnidirectional pressure signal depending on the direction associated with that frequency.

The present invention further provides a system for separating a mixture of acoustic signals from a plurality of sources, the system comprising:

sensing means arranged to provide pressure signals indicative of time varying acoustic pressure in the mixture; and processing means arranged to define a series of time windows; and for each time window to:

a) generate from the pressure signals a series of sample values of measured directional pressure gradient;

b) identify different frequency components of the pressure signals c) for each frequency component define an associated direction;

d) from the frequency components and their associated directions generate a separated signal for the selected one or more sources.

The system may be arranged to carry out any of the method steps of the method of the invention.

Preferred embodiments of the present invention will now be described by way of example only with reference to the accompanying drawings.

DESCRIPTION OF THE PREFERRED EMBODIMENTS

Figure 1:
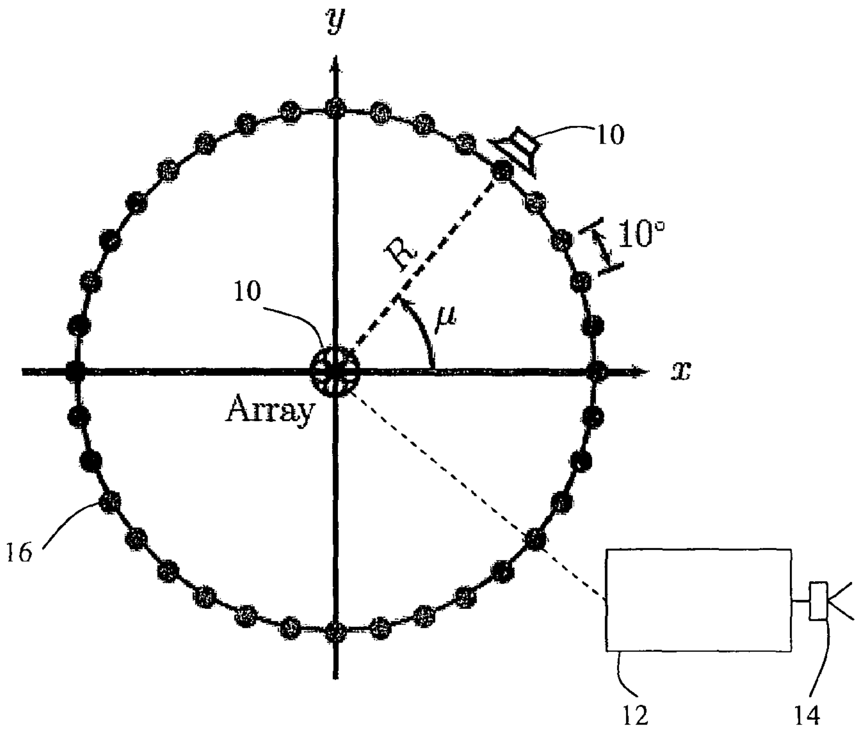
FIG. 1 is a schematic diagram of a system according to an embodiment of the invention.

Referring to FIG. 1, an audio source separation system according to a first embodiment of the invention comprises a microphone array 10, a processing system, in this case a personal computer 12, arranged to receive audio signals from the microphone array and process them, and a speaker system 14 arranged to generate sounds based on the processed audio signals. The microphone array 10 is located at the centre of a circle of 36 nominal source positions 16. Sound sources 18 can be placed at any of these positions and the system is arranged to separate the sounds from each of the source positions 16. Clearly in a practical system the sound source positions could be spaced apart in a variety of ways.

Figure 2:
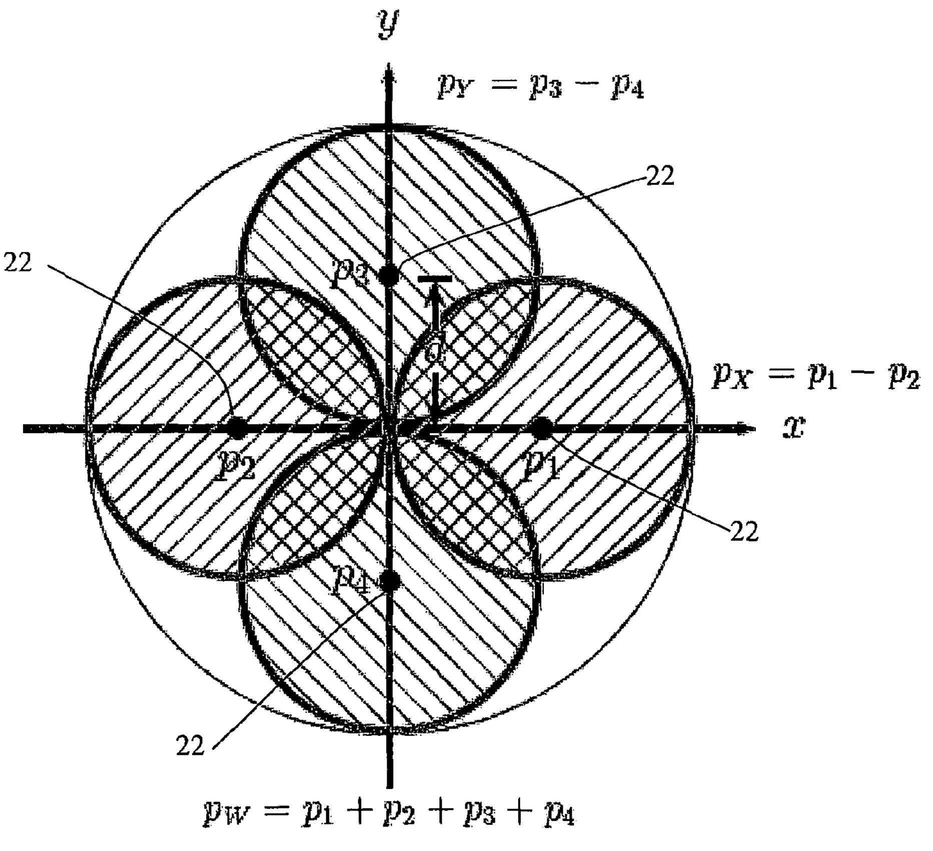
FIG. 2 is a diagram of a microphone array forming part of the system of FIG. 1.

Referring to FIG. 2, the microphone array 10 comprises four omnidirectional microphones, or pressure sensors, 21, 22, 23, 24 arranged in a square array in a horizontal plane. The diagonals of the square define x and y axes with two of the microphones 21, 22 lying on the x axis and two 23, 24 lying on the y axis. The four sensors 21, 22, 23, 24 are arranged to generate pressure signals $p_1$, $p_2$, $p_3$, $p_4$ respectively. This allows the pressure pw at the centre of the array and the pressure gradients $p_x$ and $p_y$ in the x and y directions to be determined using:

$$p_w=0.5(p_1+p_2+p_3+p_4)$$

$$p_x=p_1-p_2$$

$$p_y=p_3-p_4$$

In general, in the time-frequency domain, the pressure signal recorded by the $m^{th}$ microphone of the array, with N sources, can be written as $$p_m(\omega,t)=\sum_{n=1}^{N}h_{mn}(\omega,t)s_n(\omega,t) \tag{1}$$

where $h_{mn}(\omega,t)$ is the time-frequency representation of the transfer function from the $n^{th}$ source to the $m^{th}$ microphone, and $s_n(\omega,t)$ is the time-frequency representation of the $n^{th}$ original source. The aim of the sound source separation is estimating the individual mixture components from the observation of the microphone signals only.

Assuming that four omnidirectional microphones are positioned very closely on a plane in the geometry as shown in FIG. 2, each $h_{mn}(\omega,t)$ coefficient can be represented as a plane wave arriving from direction $\phi_n(\omega,t)$ with respect to the center of the array. Assuming the pressure at the center of the array due to this plane wave is $p_o(\omega,t)$. Then, $$h_{1n}(\omega,t)=p_o(\omega,t)e^{jkd\cos[\phi_n(\omega,t)]} \tag{2}$$

$$h_{2n}(\omega,t)=p_o(\omega,t)e^{-jkd\cos[\phi_n(\omega,t)]} \tag{3}$$

$$h_{3n}(\omega,t)=p_o(\omega,t)e^{jkd\sin[\phi_n(\omega,t)]} \tag{4}$$

$$h_{4n}(\omega,t)=p_o(\omega,t)e^{-jkd\sin[\phi_n(\omega,t)]} \tag{5}$$

where k is the wave number related to the wavelength $\lambda$ as $k=2\pi/\lambda$, j is the imaginary unit and 2d is the distance between the two microphones on the same axis. Now, define $p_W=0.5(p_1+p_2+p_3+p_4)$, $p_X=p_1-p_2$ and $p_Y=p_3-p_4$. Then, $$p_W(\omega,t)=\sum_{n=1}^{N}0.5[h_{1n}(\omega,t)+h_{2n}(\omega,t)+h_{3n}(\omega,t)+h_{4n}(\omega,t)]s_n(\omega,t) \tag{6}$$

$$p_X(\omega,t)=\sum_{n=1}^{N}[h_{1n}(\omega,t)-h_{2n}(\omega,t)]s_n(\omega,t) \tag{7}$$

$$p_Y(\omega,t)=\sum_{n=1}^{N}[h_{3n}(\omega,t)-h_{4n}(\omega,t)]s_n(\omega,t) \tag{8}$$

If kd<<1, i.e., when the microphones are positioned close to each other in comparison to the wavelength, it can be shown by using the relations $\cos(kd\cos\theta)\approx1$, $\cos(kd\sin\theta)\approx1$, $\sin(kd\cos\theta)\approx kd\cos\theta$ and $\sin(kd\sin\theta)\approx kd\sin\theta$ that, $$p_W(\omega,t)\approx\sum_{n=1}^{N}2p_o(\omega,t)s_n(\omega,t) \tag{9}$$

$$p_X(\omega,t)\approx\sum_{n=1}^{N}j2p_o(\omega,t)kd\cos[\phi_n(\omega,t)]s_n(\omega,t) \tag{10}$$

$$p_Y(\omega,t)\approx\sum_{n=1}^{N}j2p_o(\omega,t)kd\sin[\phi_n(\omega,t)]s_n(\omega,t) \tag{11}$$

The $p_W$ is similar to the pressure signal from an omnidirectional microphone, and $p_X$ and $p_Y$ are similar to the signals from two bidirectional microphones that approximate pressure gradients along the X and Y directions, respectively. These signals are also known as B-format signals which can also be obtained by four capsules positioned at the sides of a tetrahedron (P. G. Craven and M. A. Gerzon, "Coincident microphone simulation covering three dimensional space and yielding various directional outputs, U.S. Pat. No. 4,042,779) or by, coincidentally placed, one omnidirectional and two bidirectional microphones facing the X and Y directions.

The use of these signals for source separation based on intensity vector analysis will now be described.

The acoustic particle velocity, v(r,w,t) is defined in two dimensions as $$v(r,\omega,t)=\frac{1}{\rho_0 c}[p_X(\omega,t)u_x+p_Y(\omega,t)u_y] \tag{12}$$

where $\rho_o$ is the ambient air density, c is the speed of sound, $u_x$ and $u_y$ are unit vectors in the directions of corresponding axes.

The product of the pressure and the particle velocity gives instantaneous intensity. The active intensity can be found as, $$I(\omega,t)=\frac{1}{\rho_0 c}[\mathrm{Re}\{p_W^*(\omega,t)p_X(\omega,t)\}u_x+\mathrm{Re}\{p_W^*(\omega,t)p_Y(\omega,t)\}u_y] \tag{13}$$

Where * denotes conjugation and Re{●} denotes taking the real part of the argument.

Then, the direction of the intensity vector $\gamma(\omega,t)$, i.e. the direction of a single frequency component of the sound mixture at one time, can be obtained by $$\gamma(\omega,t)=\arctan\left[\frac{\mathrm{Re}\{p_W^*(\omega,t)p_Y(\omega,t)\}}{\mathrm{Re}\{p_W^*(\omega,t)p_X(\omega,t)\}}\right] \tag{14}$$

The reverberant estimate of the $n^{th}$ source, $\tilde{s}_n$ is obtained by beamforming the omnidirectional pressure signal $p_w$ in the source direction with a directivity function $J_n(\theta;\omega,t)$ so that, $$\tilde{s}_n(\omega,t)=p_W(\omega,t)J_n(\gamma(\omega,t);\omega,t) \tag{15}$$

The $p_W$ can be considered as comprising a number of components each at a respective frequency, each component varying with time. The directivity function, for a particular source and a particular time window, takes each frequency component with its associated direction $\gamma(\omega,t)$ and multiplies it by a weighting factor which is a function of that direction, giving an amplitude value for each frequency. The weighted frequency components can then be combined to form a total signal for the source.

By this weighting, the time-frequency components of the omnidirectional microphone signal are amplified more if the direction of the corresponding intensity vector (i.e. the intensity vector with the same frequency and time) is closer to the direction of the target source. It should be noted that, this weighting also has the effect of partial deconvolution as the reflections are also suppressed depending on their arrival directions.

Calculation of the directivity function from the intensity vector statistics will now be described.

The directivity function $J_n(\theta;\omega,t)$ used for the $n^{th}$ source is a function of $\theta$ only in the analyzed time-frequency bin. It is determined by the local statistics of the calculated intensity vector directions $\gamma(\omega,t)$, of which there is one for each frequency, for the analyzed short-time window.

For a reverberant room, the pressure and particle velocity components have Gaussian distributions. It may be suggested that the directions of the resulting intensity vectors for all frequencies within the analyzed short-time window are also Gaussian distributed.

In circular statistics, the equivalent of a Gaussian distribution is a von Mises distribution whose probability density function is given as:

$$f(\theta;\mu,\kappa)=\frac{e^{\kappa\cos(\theta-\mu)}}{2\pi I_0(\kappa)} \tag{16}$$

for a circular random variable $\theta$ where, $0<\theta\leq 2\pi$, $0\leq\mu<2\pi$ is the mean direction, $\kappa>0$ is the concentration parameter and $I_0(\kappa)$ is the modified Bessel function of order zero.

For N sound sources, the probability density function of the intensity vector directions (i.e. the number of intensity vectors as a function of direction) for each time window can be modeled as a mixture $g(\theta)$ of N von Mises probability density functions each with a respective mean direction of $\mu_n$, corresponding to the source directions, and a circular uniform density due to the isotropic late reverberation:

$$g(\theta)=\frac{\alpha_0}{2\pi}+\sum_{n=1}^{N}\alpha_n f(\theta;\mu_n,\kappa_n) \tag{17}$$

where, $0\leq\alpha_i\leq 1$ are the component weights, and $\Sigma_i\alpha_i=1$.

As analytical methods do not exist for finding the maximum likelihood estimates of the mixture parameters, it can be assumed that the $\alpha_n$ and $\kappa_n$ take discrete values within some boundary and the values of these parameters that maximize the likelihood can be determined numerically. The directivity function for beamforming in the direction of the $n^{th}$ source for a given time-frequency bin is then defined as $$J_n(\theta;\omega,t)=\alpha_n\frac{e^{\kappa_n(t)\cos(\theta-\mu_n)}}{2\pi I_0(\kappa_n(t))} \tag{18}$$

For simplicity, the component weights can be assumed to be equal to each other, i.e. $\alpha_n=1/(N+1)$. It can be shown by using the definition of the von Mises function in (16) that the concentration parameter $\kappa$ is logarithmically related to the 6 dB beamwidth $\theta_{BW}$ of this directivity function as $$\kappa=\ln 2/[1-\cos(\theta_{BW}/2] \tag{19}$$

Figure 3:
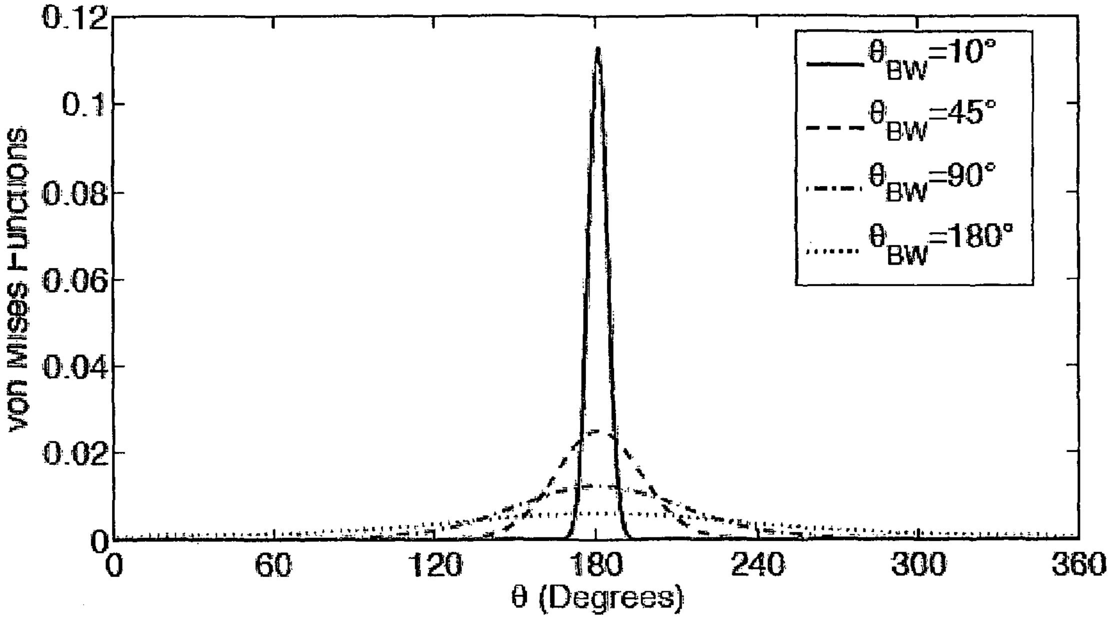
FIG. 3 is a graph showing examples of some von Mises functions of different beamwidths used in the processing performed by the system of FIG. 1.

Then, in numerical maximum likelihood estimation, it is appropriate to determine the concentration parameters from linearly increasing beamwidth values. FIG. 3 shows four von Mises functions for 6 dB beamwidths of 10° ($\kappa$=182.15), 45° ($\kappa$=9.10), 90° ($\kappa$=2.37) and 180° ($\kappa$=0.69).

Figure 4:
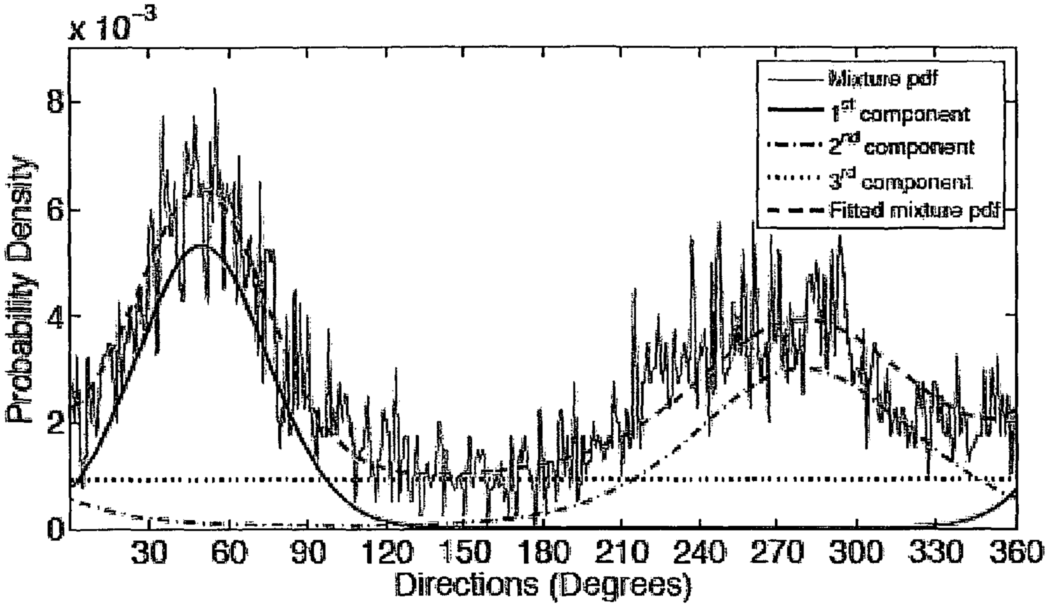
FIG. 4 is a graph showing probability density functions, estimated individual mixture components, and fitted mixture for two active sources in the system of FIG. 1.
Figure 5:
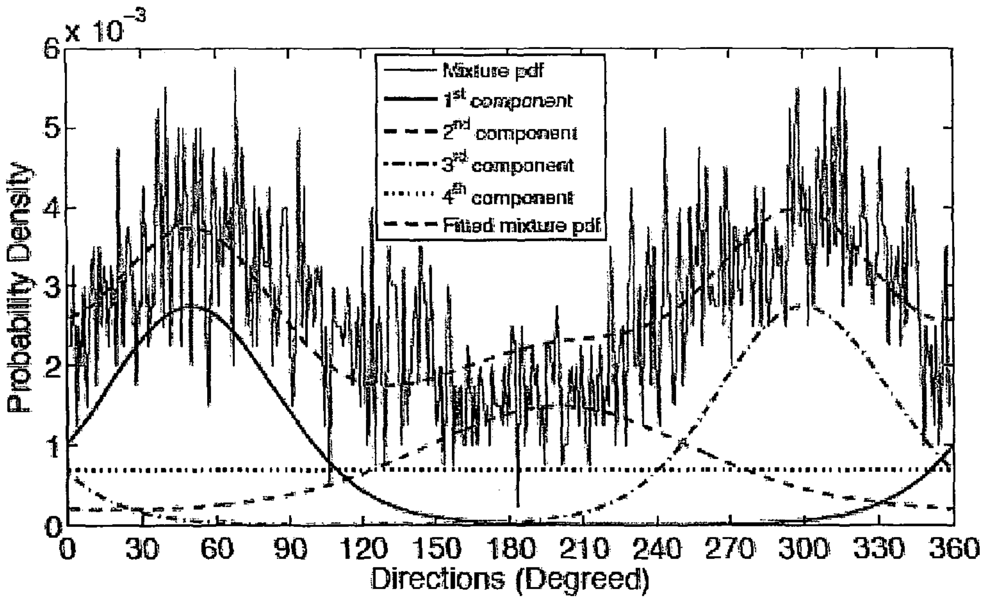
FIG. 5 is a graph, similar to FIG. 5, for three active sources in the system of FIG. 1.

FIGS. 4 and 5 show examples of the probability density functions of the intensity vector directions, individual mixture components and the fitted mixtures for two and three speech sources, respectively. The sources are at 50° and 280° for FIG. 4 and 50°, 200° and 300° for FIG. 5. The intensity vector directions were calculated for an exemplary analysis window of length 4096 samples at 44.1 kHz in a room with reverberation time of 0.83 s.

It should be noted that the fitting is applied to determine the directivity functions. Therefore, testing the goodness-of-fit by methods such as the Kuiper test is not discussed here.

Figure 6:
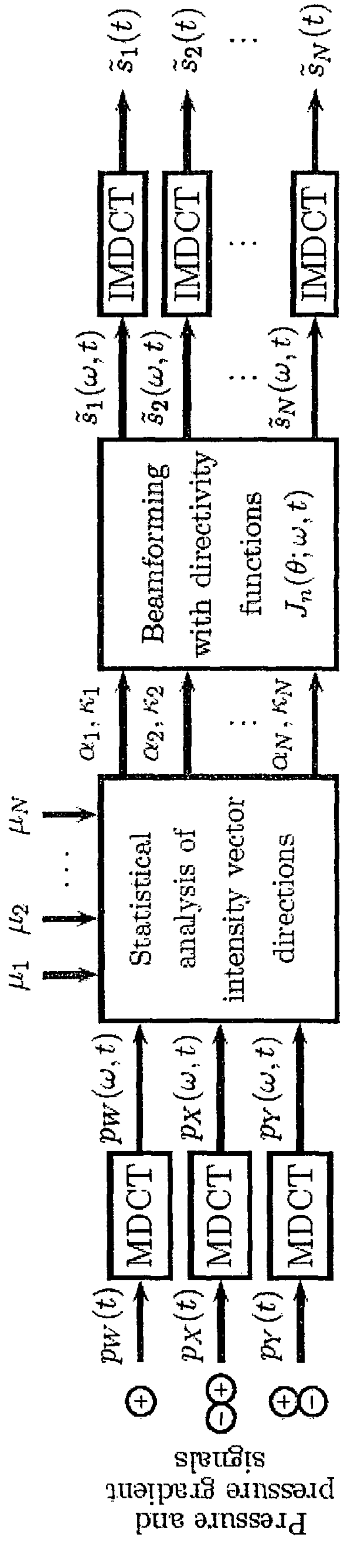
FIG. 6 is a functional diagram of the processing stages performed by the system of FIG. 1.

The processing stages of the method of this embodiment, as carried out by the PC 12 can be divided into 5 steps as shown in FIG. 6.

Initially, the pressure and pressure gradient signals $p_w(t)$ $p_x(t)$ $p_y(t)$ are obtained from the microphone array 10. These signals are sampled at a sample rate of, in this case, 44.1 kHz, and the samples divided into time windows each of 4096 samples. Then, for each time window the modified discrete cosine transform (MDCT) of these signals are calculated. Next, the intensity vector directions are calculated and using the known source directions, von Mises mixture parameters are estimated. Next, beamforming is applied to the pressure signal for each of the target sources using the directivity functions obtained from the von Mises functions. Finally, inverse modified cosine transform (IMDCT) of the separated signals for the different sources are calculated, which reveals the time-domain estimates of the sound sources.

The pressure and pressure gradient signals are calculated from the signals from the microphone array 10 as described above. However they can be obtained directly in B-format by using one of the commercially available tetrahedron microphones. The spacing between the microphones should be small to avoid aliasing at high frequencies. Phase errors at low frequencies should also be taken into account if a reliable frequency range for operation is essential (F. J. Fahy, Sound Intensity, 2nd ed. London: E&FN SPON, 1995).

Time-frequency representations of the pressure and pressure gradient signals are calculated using the modified discrete cosine transform (MDCT) where subsequent time window blocks are overlapped by 50% (J. P. Princen and A. Bradley, "Analysis/synthesis filter bank design based on time domain aliasing cancellation, "IEEE Trans. Acoustic, Speech, Signal Process., vol. 34, no. 5, pp. 1153-1161, October 1986). The MDCT is chosen due to its overlapping and energy compaction properties to decrease the edge effects across blocks that occur as the directivity function used for each time-frequency bin changes. Perfect reconstruction is achieved with a window function $w_k$ that satisfies $w_k^2+w_{k+M}^2=1$, where 2M is the window length. In this work, the following window function is used:

$$w_k=\sin\left(\frac{\pi}{2}\sin^2\left[\frac{\pi}{2M}\left(k+\frac{1}{2}\right)\right]\right). \tag{20}$$

The intensity vector directions are calculated for each frequency within each time window, and rounded to the nearest degree. The mixture probability density is obtained from the histogram of the found directions for all frequencies. Then, the statistics of these directions are analyzed in order to estimate the mixture component parameters as in (17). For numerical maximum likelihood estimation, the 6 dB beamwidth is spanned linearly from 10° to 180° with 10° intervals and the related concentration parameters are calculated by using (19). Beamwidths smaller than 10° were not included since very sharp clustering around a source direction was not observed from the densities of the intensity vector directions. As the point source assumption does not hold for real sound sources, such clustering is not expected even in anechoic environments due to the observed finite aperture of a sound source at the recording position. Beamwidths more than 180° were also not considered as the resulting von Mises functions are not very much different from the uniform density functions.

Once the individual acoustic signals for the different sources have been obtained it will be appreciated that they can be used in a number of ways. For example, they can be played back through the speaker system 14 either individually or in groups. It will also be appreciated that the separation is carried out independently for each time window, and can be carried out at high speed. This means that, for each sound source, the separated signals from the series of time windows can be combined together into a continuous acoustic signal, providing continuous real time source separation.

The algorithm was tested for mixtures of two and three sources for various source positions, in two rooms with different reverberation times. The recording setup, procedure for obtaining the mixtures, and the performance measures are discussed first below, followed by the results presenting various factors that affect the separation performance.

The convolutive mixtures used in the testing of the algorithm were obtained by first measuring the B-format room impulse responses, convolving anechoic sound sources with these impulse responses and summing the resulting reverberant recordings. This method exploits the linearity and time-invariance assumptions of the linear acoustics.

The impulse responses were measured in two different rooms. The first room was an ITU-R BS1116 standard listening room with a reverberation time of 0.32 s. The second one was a meeting room with a reverberation time of 0.83 s. Both rooms were geometrically similar (L=8 m; W=5.5 m; H=3 m) and were empty during the tests.

For both rooms, 36 B-format impulse response recordings were obtained at 44.1 kHz with a SoundField microphone system (SPS422B) and a loudspeaker (Genelec 1030A), using a 16th-order maximum length sequence (MLS) signal. Each of the 36 measurement positions were located on a circle of 1.6 m radius for the first room, and 2.0 m radius for the second room, as shown in FIG. 1. The recording points were at the center of the circles, and the frontal directions of the recording setup were fixed in each room. Source locations were selected between 0° to 350° with 10° intervals with respect to the recording setup. At each measurement position, the acoustical axis of the loudspeaker was facing towards the array location, while the orientation of the microphone system was kept fixed. The source and recording positions were 1.2 m high above the floor. The loudspeaker had a width of 20 cm, corresponding to the observed source apertures of 7.15° and 5.72° at the recording positions for the first and second rooms, respectively.

Anechoic sources sampled at 44.1 kHz were used from a commercially available CD entitled "Music for Archimedes". The 5-second long portions of male English speech (M), female English speech (F), male Danish speech (D), cello music (C) and guitar music (G) sounds were first equalized for energy, then convolved with the B-format impulse responses of the desired directions. The B-format sounds were then summed to obtain FM, CG, FC and MG for two source mixtures and FMD, CFG, MFC, DGM for three source mixtures.

There exist various criteria for the performance measure of source separation techniques. In this work, one-at-a-time signal-to-interference ratio (SIR) is used for quantifying the separation, as separately synthesized sources are summed together to obtain the mixture. This metric is defined as:

$$SIR = \frac{1}{N}\sum_{i=1}^{N} 10\log\left[\frac{E\{(\tilde{s}_{i|s_i})^2\}}{E\left\{\left(\sum_{i\neq j}\tilde{s}_{i|s_j}\right)^2\right\}}\right] \tag{21}$$

where N is the total number of sources, $\tilde{s}_{i|s_i}$ is the estimated source $\tilde{s}_i$ when only source $s_i$ is active, $\tilde{s}_{i|s_j}$ is the estimated source $\tilde{s}_i$ when only source $s_j$ is active and E{●} is the expectation operator. It has been suggested for convolutive mixtures that values of SIR above 15 dB indicate a good separation.

In addition to SIR, signal-to-distortion ratio (SDR) has also been used in order to quantify the quality of the separated sources. However, the SDR is sensitive to the reverberation content of the original source used as the reference. If the anechoic source is used for comparison, this measure penalizes the effect of the reverberation even if the separation is quite good. On the other hand, if the reverberant source as observed at the recording position is used, then any deconvolution achieved in addition to the separation is also penalized as distortion.

When only one sound source is active, any of the B-format signals or cardioid microphone signals that can be obtained from them can be used as the reference of that source. All of these signals can be said to have perfect sound quality, as the reverberation is not distortion. Therefore, it is fair to choose the reference signal that results in the best SDR values.

A hypercardioid microphone has the highest directional selectivity that can be obtained by using B-format signals providing the best signal-to-reverberation gain. Since, the proposed technique performs partial deconvolution in addition to reverberation, a hypercardioid microphone most sensitive in the direction of the $i^{th}$ sound source is synthesized from the B-format recordings when only one source is active, such that, $$p_{Ci|s_i} = \frac{1}{4}p_{Wi|s_i} + \frac{3}{4}(p_{Xi|s_i}\cos\mu_i + p_{Yi|s_i}\sin\mu_i) \tag{22}$$

The source signal obtained in this way is used as the reference signal in the SDR calculation, $$SDR = \frac{1}{N}\sum_{i=1}^{N} 10\log\left(\frac{E\{(\tilde{s}_i)^2\}}{E\{(\tilde{s}_i - \alpha_i p_{Ci|s_i})^2\}}\right) \tag{23}$$

where $\alpha_i = E\{(\tilde{s}_i)^2\}/E\{(p_{Ci|s_i})^2\}$.

Figure 7:
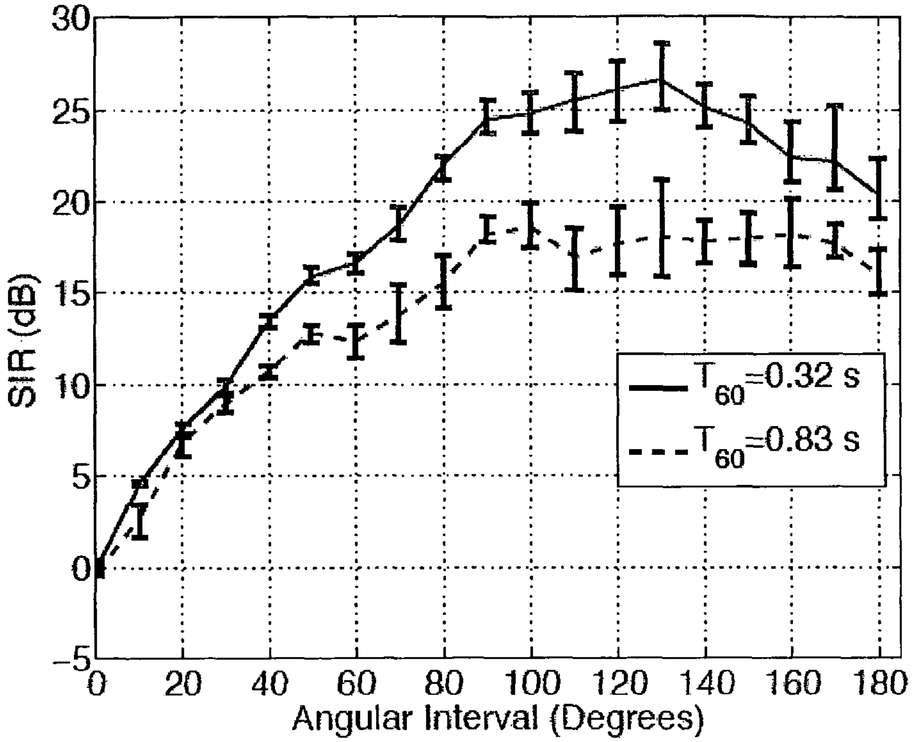
FIG. 7 is a graph of signal to interference ratio as a function of angular source separation for a two source system in two different rooms.
Figure 8:
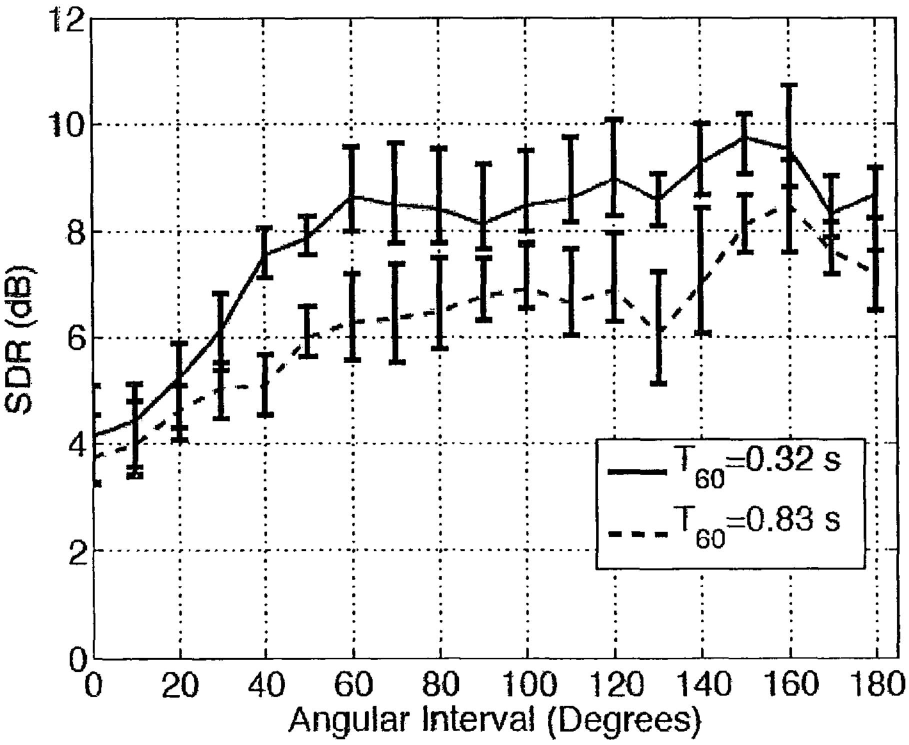
FIG. 8 is a graph of signal to distortion ratio as a function of angular source separation for a two source system in two different rooms.

FIGS. 7 and 8 show the signal-to-interference (SIR) and signal-to-distortion (SDR) ratios in dB plotted against the angular interval between the two sound sources. The first sound source was positioned at 0° and the position of the second source was varied from 0° to 180° with 10° intervals to yield the corresponding angular interval. The tests were repeated both for the listening room and for the reverberant room. The error bars were calculated using the lowest and highest deviations from the mean values considering all four mixtures (FM, CG, FC and MG).

As expected, better separation is achieved in the listening room than in the reverberant room. The SIR values increase, in general, when the angular interval between the sound sources increases, although at around 180°, the SIR values decrease slightly because for this angle both sources lie on the same axis causing vulnerability to phase errors.

The SDR values also increase when the angular interval between the two sources increases. Similar to the SIR values, the SDR values are better for the listening room which has the lower reverberation time. The similar trend observed for the SDR and SIR values indicates that the distortion is mostly due to the interferences rather than the processing artifacts.

Figure 9:
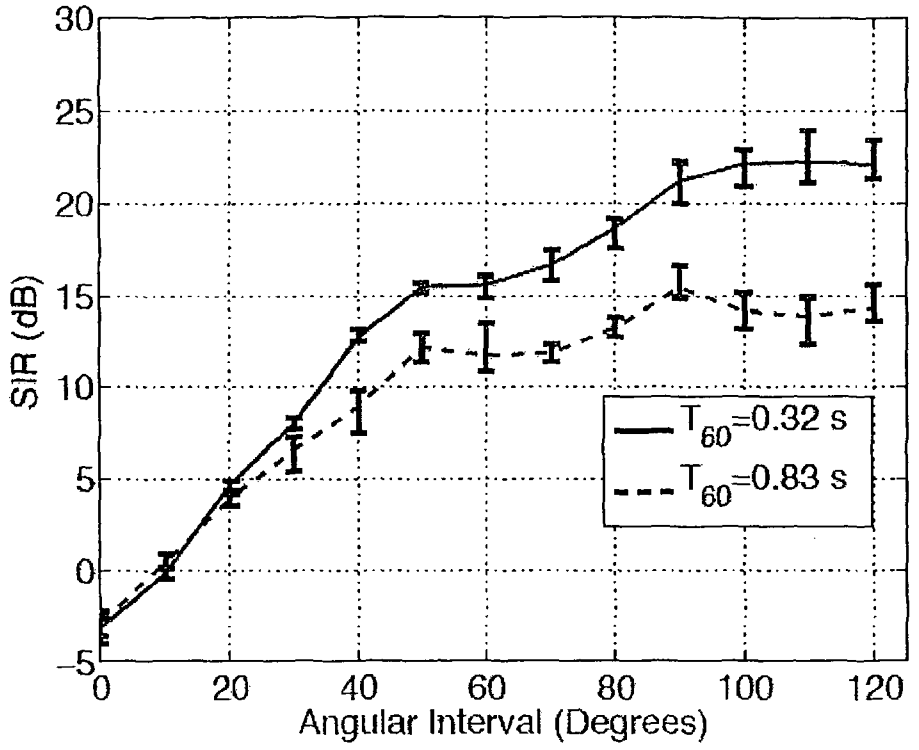
FIG. 9 is a graph of signal to interference ratio as a function of angular source separation for a three source system in two different rooms.
Figure 10:
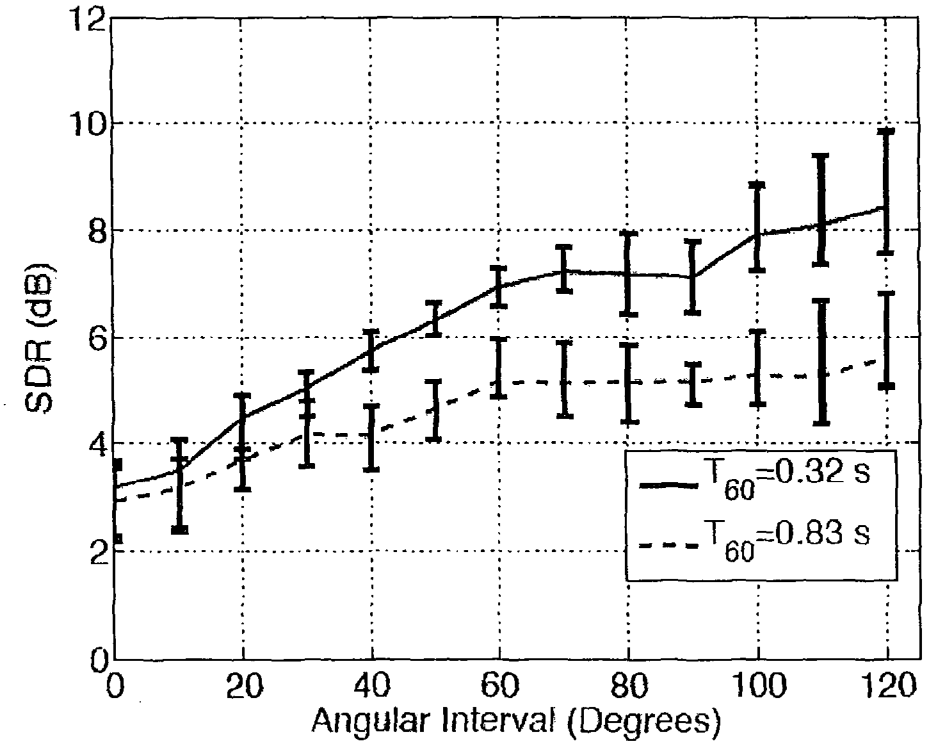
FIG. 10 is a graph of signal to distortion ratio as a function of angular source separation for a three source system in two different rooms.

FIGS. 9 and 10 show the signal-to-interference (SIR) and signal-to-distortion (SDR) ratios in dB plotted against the angular interval between the three sound sources. The first sound source was positioned at 0°, the position of the second source was varied from 0° to 120° with 10° increasing intervals, and the position of the third source was varied from 360° to 240° with 10° decreasing intervals to yield the corresponding equal angular intervals from the first source. The tests were repeated both for the listening room and the reverberant room. The error bars were calculated using the lowest and highest deviations from the mean values considering all four mixtures (FMD, CFG, MFC and DMG).

The SIR values display a similar trend to the two-source mixtures, increasing with increasing angular intervals and taking higher values in the room with less reverberation time. The values, however, are lower in general from those obtained for the two-source mixtures, as expected.

The SDR values indicate better sound quality for larger angular intervals between the sources and for the room with less reverberation time. However, the quality is usually less than that obtained for the two-source mixtures.

In the embodiments described above an acoustic source separation method for convolutive mixtures has been presented. Using this method, the intensity vector directions can be found by using the pressure and pressure gradient signals obtained from a closely spaced microphone array. The method assumes a priori knowledge of the sound source directions. The densities of the observed intensity vector directions are modeled as mixtures of von Mises density functions with mean values around the source directions and a uniform density function corresponding to the isotropic late reverberation. The statistics of the mixture components are then exploited for separating the mixture by beamforming in the directions of the sources in the time-frequency domain.

As described above, the method has been extensively tested for two and three source mixtures of speech and instrument sounds, for various angular intervals between the sources, and for two rooms with different reverberation times. The embodiments described provide good separation as quantified by the signal-to-interference (SIR) and signal-to-distortion (SDR) ratios. The method performs better when the angular interval between the sources is large. Similarly, the method performs slightly better for the two-source mixtures in comparison with three-source mixtures. As expected, higher reverberation time reduces the separation performance and increases distortion.

Important advantages of the embodiment described are the compactness of the array, low number of individual channels to be processed, and the simple closed-form solution it provides as opposed to adaptive or iterative source separation algorithms. As such, the method of this embodiment can be used in teleconferencing applications, hearing aids, acoustical surveillance, and speech recognition among others.

For example, in a teleconferencing system it might be desirable for speech from a single participant to be separated from other noise and interfering speech sounds and played back, or it might be desirable for the separated sound source signals to be played back from different relative positions than the relative positions of the original sources. In acoustical surveillance the method can be used to extract sound from one source so that the remaining sounds, possibly from a large number of other sources, can be analysed together. This can be used, for example, to remove unwanted interference such as a loud siren, which otherwise interferes with analysis of the recorded sound. The method can also be used as a pre-processing stage in hearing aid devices or in automatic speech recognition and speaker identification applications, as a clean signal free from interferences improves the performance of recognition and identification algorithms.

Further improvements could be achieved by applying this method together with other source separation methods that exploit the differences in the frequency content of the sound sources.

Figure 11:
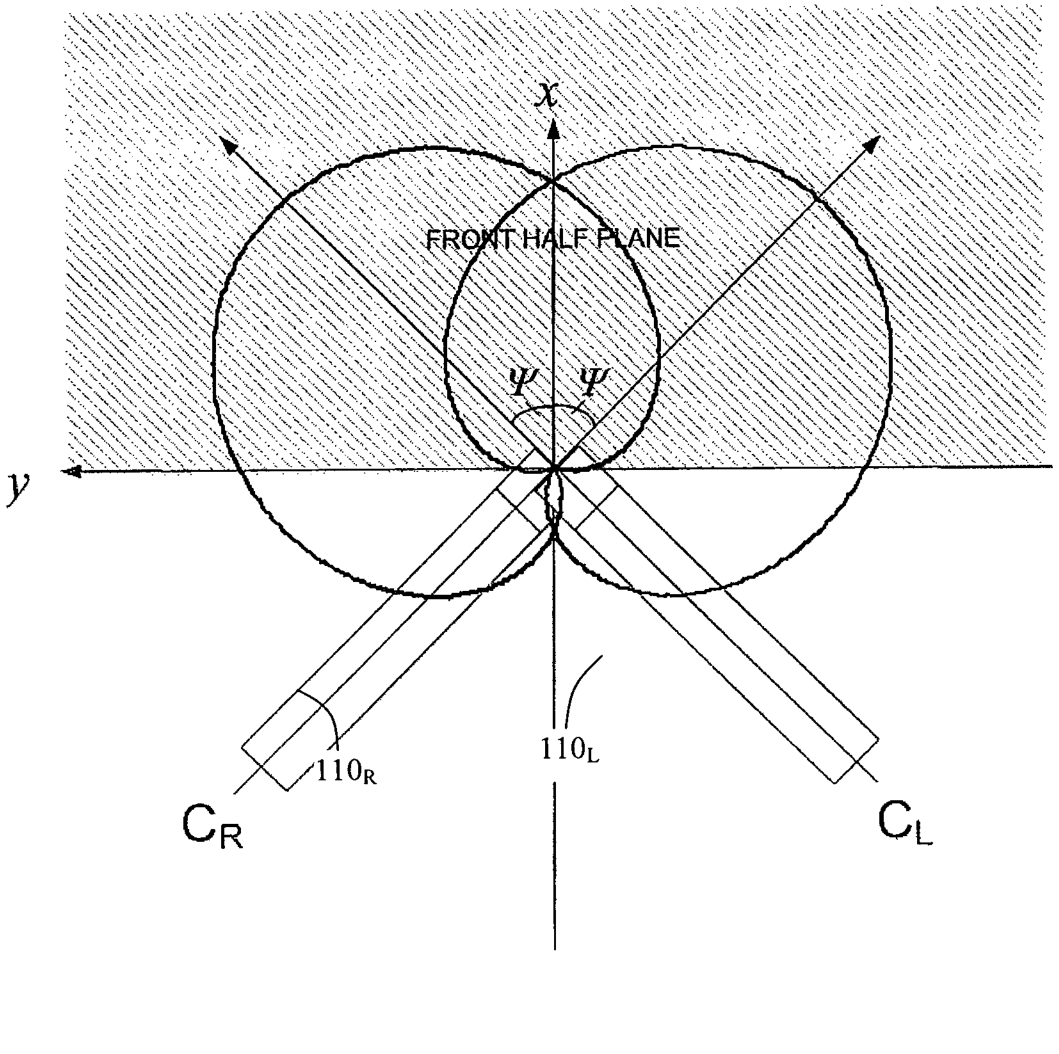
FIG. 11 is schematic diagram of a microphone array of a system according to a further embodiment of the invention.

Referring to FIG. 11, in a further embodiment of the invention, if all sound sources and their reflections are restricted to the horizontal half plane from $-\pi/2$ to $\pi/2$, then the directions of the intensity vectors can be calculated using only two pressure gradient microphones $\mathbf{110}_L$, $\mathbf{110}_R$ with directivity patterns of $D_L(\theta)$ and $D_R(\theta)$. For a plane wave, $p(\omega,t)$ arriving from direction $\gamma$, the microphone signals become, $$C_L(\omega,t)=p(\omega,t)D_L(\gamma) \tag{24}$$

$$C_R(\omega,t)=p(\omega,t)D_R(\gamma) \tag{25}$$

If $C_L(\omega,t)/C_R(\omega,t)$ is an invertible, one-to-one function, $\gamma$ can be calculated.

For example, assume that two cardioid microphones are coincidentally placed with look directions of $-\psi$ and $\psi$ as shown in FIG. 11. The recorded signals for a plane wave $p(\omega,t)$ arriving from direction $\gamma$ can be written as:

$$C_L(\omega,t)=p(\omega,t)[0.5(1+\cos(\gamma-\psi))],$$

$$C_R(\omega,t)=p(\omega,t)[0.5(1+\cos(\gamma+\psi))]. \tag{26}$$

By defining the ratio of these signals as K, $$K=\frac{1+\cos(\gamma-\psi)}{1+\cos(\gamma+\psi)}, \tag{27}$$

it can be shown by using trigonometric relations that $$\gamma=\sin^{-1}\left(\frac{K-1}{\sqrt{1+K^2-2K\cos 2\psi}}\right)-\tan^{-1}\left(\frac{(1-K)\cos\psi}{(1+K)\sin\psi}\right). \tag{28}$$

This enables the direction of the intensity vectors to be determined, and a directivity function to be derived which can then be used for beamforming to determine the separated acoustic signals for the sources.

Figure 12:
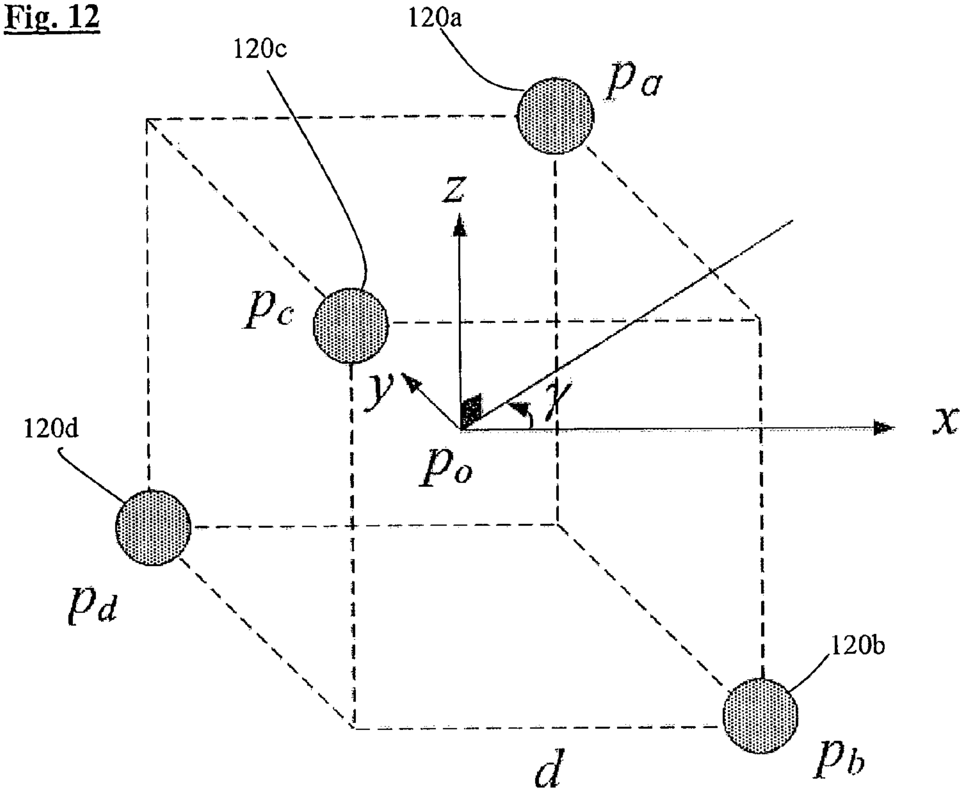
FIG. 12 is a schematic diagram of the microphone array of a system according to a further embodiment of the invention.

Referring to FIG. 12, in a further embodiment of the invention a compact microphone array used for intensity vector direction calculation is made up of four microphones 120*a*, 120*b*, 120*c*, 120*d* placed at positions which correspond to the four non-adjacent corners of a cube of side length d. This geometry forms a tetrahedral microphone array.

Let us consider a plane wave arriving from the direction $\gamma(\omega,t)$ on the horizontal plane with respect to the center of the cube. If the pressure at the centre due to this plane wave is $p_o(\omega,t)$, then the pressure signals $p_a$, $p_b$, $p_c$, $p_d$ recorded by the four microphones 120*a*, 120*b*, 120*c*, 120*d* can be written as, $$p_a(\omega,t)=p_o(\omega,t)e^{jkd\sqrt{2}/2\,\cos(\pi/4-\gamma(\omega,t))}, \tag{29}$$

$$p_b(\omega,t)=p_o(\omega,t)e^{jkd\sqrt{2}/2\,\sin(\pi/4-\gamma(\omega,t))}, \tag{30}$$

$$p_c(\omega,t)=p_o(\omega,t)e^{-jkd\sqrt{2}/2\,\cos(\pi/4-\gamma(\omega,t))}, \tag{31}$$

$$p_d(\omega,t)=p_o(\omega,t)e^{-jkd\sqrt{2}/2\,\sin(\pi/4-\gamma(\omega,t))}, \tag{32}$$

where k is the wave number related to the wavelength λ as k=2π/λ, j is the imaginary unit and d is the length of the one side of the cube. Using these four pressure signals, B-format signals, $p_W$, $p_X$ and $p_Y$ can be obtained as:

$$p_W=0.5(p_a+p_b+p_c+p_d),$$

$$p_X=p_a+p_b-p_c-p_d \text{ and}$$

$$p_Y=p_a-p_b-p_c+p_d.$$

If, kd<<1 i.e., when the microphones are positioned close to each other in comparison to the wavelength, it can be shown by using the relations cos(kd cos γ)≈1, cos(kd sin γ)≈1, sin(kd cos γ)≈kd cos γ and sin(kd sin γ)≈kd sin γ that, $$p_W(\omega,t)=2p_o(\omega,t), \quad (33)$$

$$p_X(\omega,t)=j2p_o(\omega,t)kd\cos(\gamma(\omega,t)), \quad (34)$$

$$p_Y(\omega,t)=j2p_o(\omega,t)kd\sin(\gamma(\omega,t)) \quad (35)$$

The acoustic particle velocity, v(r,w,t), instantaneous intensity, and direction of the intensity vector, γ(ω,t) can be obtained from $p_x$, $p_y$, and $p_w$ using equations (12), (13) and (14) above.

Since the microphones 120*a*, 120*b*, 120*c*, 120*d* in the array are closely spaced, plane wave assumption can safely be made for incident waves and their directions can be calculated. If simultaneously active sound signals do not overlap directionally in short time-frequency windows, the directions of the intensity vectors correspond to those of the sound sources randomly shifted by major reflections.

The exhaustive separation of the sources by decomposing the sound field into plane waves using intensity vector directions will now be described. This essentially comprises taking N possible directions, and identifying from which of those possible directions the sound is coming, which indicates the likely positions of the sources.

In a short time-frequency window, the pressure signal $p_W(\omega,t)$ can be written as the sum of pressure waves arriving from all directions, independent of the number of sound sources. Then, a crude approximation of the plane wave s(μ, ω,t) arriving from direction μ can be obtained by spatial filtering $p_W(\omega,t)$ as, $$\tilde{s}(\mu,\omega,t)=p_W(\omega,t)f(\gamma(\omega,t);\mu,\kappa), \quad (36)$$

where $f(\gamma(\omega,t);\mu,\kappa)$ is the directional filter defined by the von Mises function, which is the circular equivalent of the Gaussian function defined by equation (16) as described above.

Spatial filtering involves, for each possible source direction or 'look direction' multiplying each frequency component by a factor which varies (as defined by the filter) with the difference between the look direction and the direction from which the frequency component is detected as coming.

Figure 13:
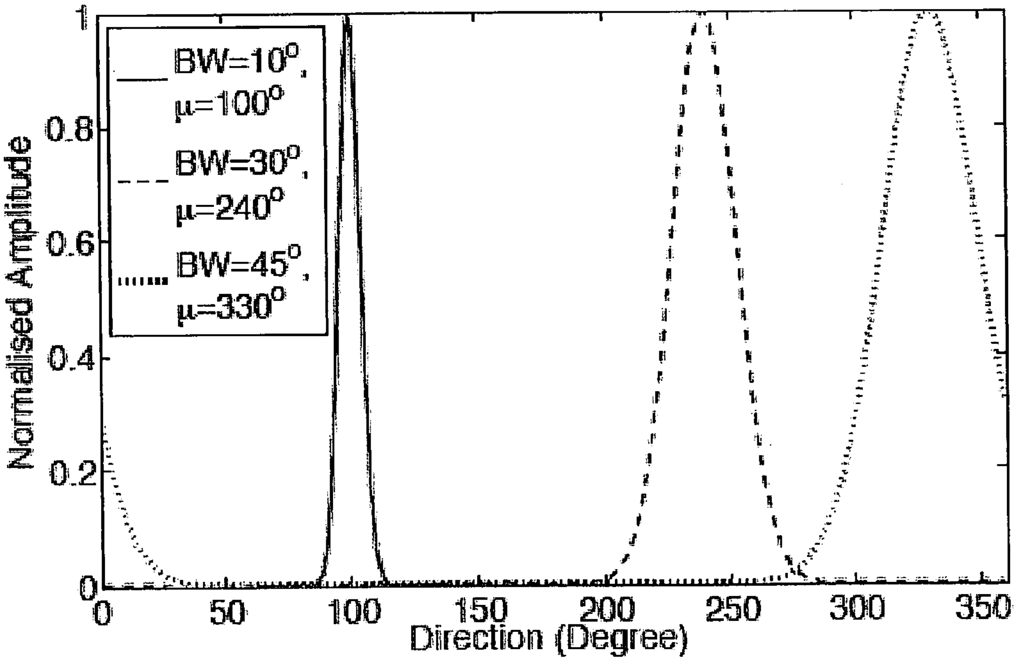
FIG. 13 is a graph showing examples of some von Mises functions of different beamwidths used in the processing performed by the system of FIG. 12

FIG. 13 shows the plot of the three von Mises directional filters with 10 dB, 30 dB and 45 dB beamwidths and 100°, 240° and 330° pointing directions, respectively normalised to have maximum values of 1. By this directional filtering, the time-frequency samples of the pressure signal $p_W$ are emphasized if the intensity vectors for these samples are on or around the look direction μ; otherwise, they are suppressed.

For exhaustive separation, i.e. separation of the mixture between a total set of N possible source directions, N directional filters are used with look directions μ varied by 2π/N intervals. Then, the spatial filtering yields a row vector $\tilde{s}$ of size N for each time-frequency component:

$$\tilde{s}(\omega,t)=\begin{bmatrix} f_1(\omega,t) & 0 & \dots & 0 \\ 0 & f_2(\omega,t) & \dots & 0 \\ \vdots & \vdots & \ddots & 0 \\ 0 & 0 & \dots & f_N(\omega,t) \end{bmatrix}\begin{bmatrix} p_W(\omega,t) \\ p_W(\omega,t) \\ \vdots \\ p_W(\omega,t) \end{bmatrix} \quad (37)$$

where $f_i(\omega,t)=f(\gamma(\omega,t);\mu_i,\kappa)$.

The elements of this vector can be considered as the proportion of the frequency component that is detected as coming from each of the N possible source directions.

This method implies block-based processing, such as with the overlap-add technique. The recorded signals are windowed, i.e. divided into time periods or windows of equal length. and converted into frequency domain after which each sample is processed as in (37). These are then converted back into time-domain, windowed with a matching window function, overlapped and added to remove block effects.

The selection of the time window size is important. If the window size is too short, then low frequencies can not be calculated efficiently. If, however, the window size is too long, both the correlated interference sounds and reflections contaminate the calculated intensity vector directions due to simultaneous arrivals.

It should also be noted that although the processing is done in the frequency domain, the deterministic application of the spatial filter eliminates any permutation problem, which is normally observed in other frequency-domain BSS techniques due to independent application of the separation algorithms in each frequency bin.

Let us assume that the exhaustive separation by block-based processing yields a time-domain signal matrix $\tilde{S}$ of size N×L, where L is the common length (in terms of the number of samples) of the signals and typically N<<L. Using (36) and (37), it can be shown that the column wise sum of $\tilde{S}$ equals to $p_W(t)$, because, $\int_0^{2\pi}\tilde{s}(\mu,\omega,t)d\mu=p_W(\omega,t)$ due to the fact that $\int_0^{2\pi}f(\theta;\mu,\kappa)d\mu=1$. Therefore, the exhaustive separation does not introduce additional noise or artifact, which is not present in $p_W(t)$ originally.

The singular value decomposition (SVD) of the signal matrix $\tilde{S}$ can be expressed as, $$\tilde{S}=UDV^T=\sum_{k=1}^{p}\sigma_k u_k v_k^T, \quad (38)$$

where $U\in R^{N\times N}$ is an orthonormal matrix of left singular vectors $u_k$, $V\in R^{L\times L}$ is an orthonormal matrix of right singular vectors $v_k$, $D\in R^{N\times L}$ is a pseudo-diagonal matrix with $\sigma_k$ values along the diagonals and p=min(N,L).

The dimension of the data matrix $\tilde{S}$ can be reduced by only considering a signal subspace of rank m, which is selected according to the relative magnitudes of the singular values as, $$\breve{S}=\sum_{k=1}^{m}\sigma_k u_k v^T. \quad (39)$$

Figures 14A, 14B, 14C, 14D, 14E, 14F, 14G:
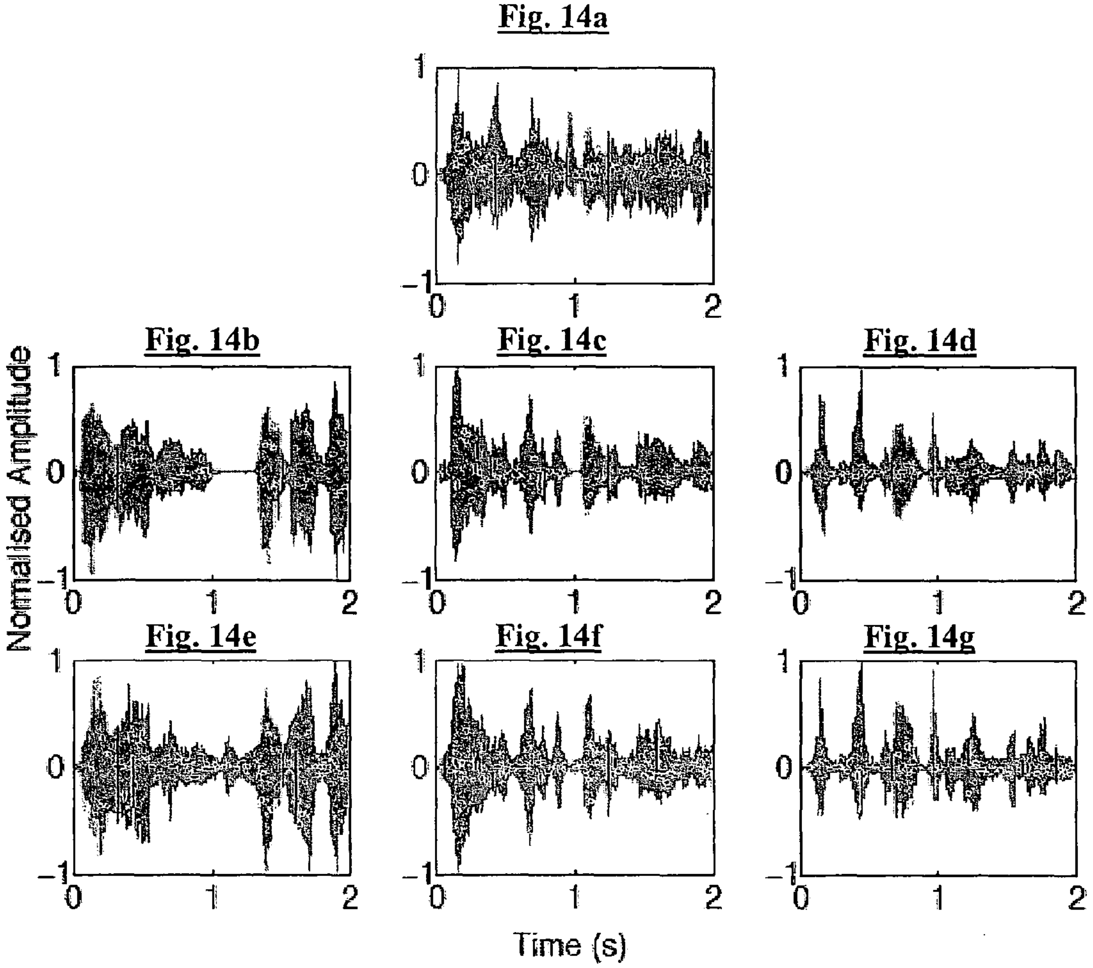
FIGS. 14*a-g* show a mixture signal $p_W(t)$ (FIG. 14*a*), reverberant originals of three signals making up the mixture signal (FIGS. 14*b-d*)) and separated signals (FIGS. 14*e-g*) obtained from the mixture using the system of FIG. 12

By selecting only the highest m singular values, independent rows of the $\breve{S}$ matrix are obtained that correspond to the individual signals of the mixture. FIG. 14*a* shows the mixture signal $p_W(t)$, FIGS. 14*b*, 14*c* and 14*d* show the reverberant originals of each mixture signal and FIGS. 14*e*, 14*f* and 14*g* show the separated signals for three speech sounds at directions 30°, 100° and 300° recorded in a room with reverberation time of 0.32 s. The data matrix is of size N=360 and L=88200 samples at 44.1 kHz sampling frequency, calculated using a block window size of 4096 samples. The signal subspace has been decomposed using the highest three singular values. The three rows of the data matrix with highest r.m.s. energy has been plotted. The number of the highest singular values that are used in dimensionality reduction is selected to be equal to or higher than a practical estimate of the number of sources in the environment. Alternatively, this number is estimated by simple thresholding of the singular values.

Figure 15:
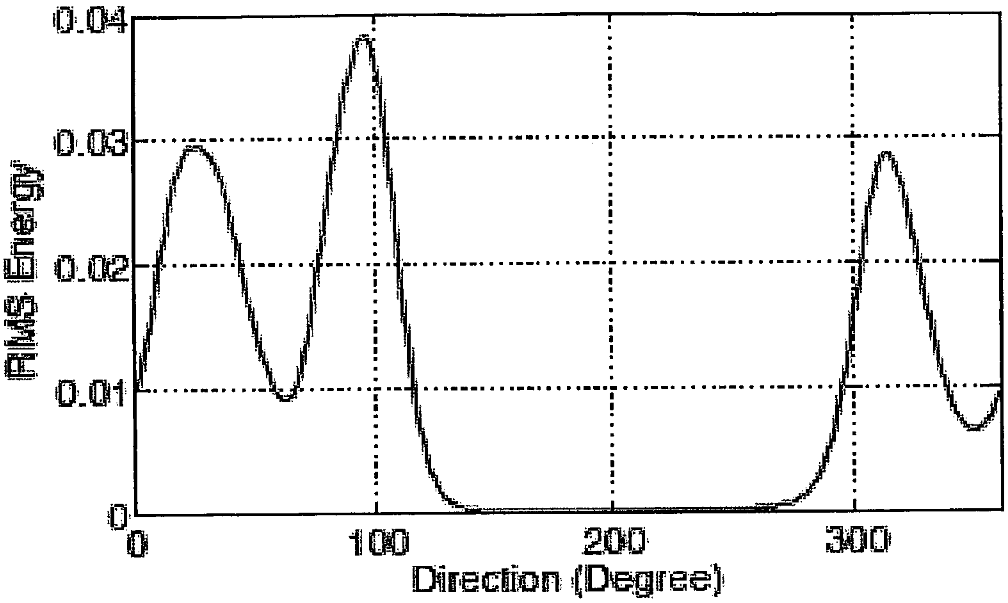
FIG. 15 is a graph showing the r.m.s. energies of the signals in the mixture of FIG. 14.

When, the energies of the signals at each row of the reduced $\check{S}$ matrix are calculated and plotted, peaks are observed at some directions. FIG. 15 shows these r.m.s. energies for the previously given separation example. These directions can be used as an indication of the directions of the separated sources. However, the accuracy of the source directions found by these local maxima can change due to the fact that highly correlated early reflections of a sound may cause a shift in the calculated intensity vector directions. While the selection of the observed direction, rather than the actual one is preferable to obtain better SIR for the purposes of BSS, for source localisation problems, a correction should be applied if dominant early reflections are present in the environment.

The algorithm has been tested with 2-, 3- and 4-source mixtures of 2-second long sound signals consisting of male speech (M), female speech (F), cello (C) and trumpet (T) music of equal energy recorded in a room of size (L=8 m; W=5.5 m; H=3 m) with a reverberation time of 0.32 s. The 2-source mixture contained MF sounds where the first source direction was fixed at 0° and the second source direction was varied from 30° to 330° with 30° intervals. Therefore, the angular interval between the sources was varied and 11 different mixtures were obtained. The 3-source mixture contained MFC sounds, where the direction of M was varied from 0° to 90°, direction of F was varied from 120° to 210° and direction of C was varied from 240° to 330° with 30° intervals. Therefore, 4 different mixtures were obtained while the angular separation between the sources were fixed at 120°. The 4-source mixture contained MFCT sounds, where the direction of M was varied from 0° to 60°, direction of F was varied from 90° to 150°, direction of C was varied from 180° to 240° and direction of T was varied from 270° to 330° with 30° intervals. Therefore, 3 different mixtures were obtained while the angular separation between the sources were fixed at 90°. Processing was done with a block size of 4096 and a beamwidth of 10° for creating a data matrix of size 360×88200 with a sampling frequency of 44.1 kHz. Dimension reduction was carried out using only the highest six singular values.

Figure 16:
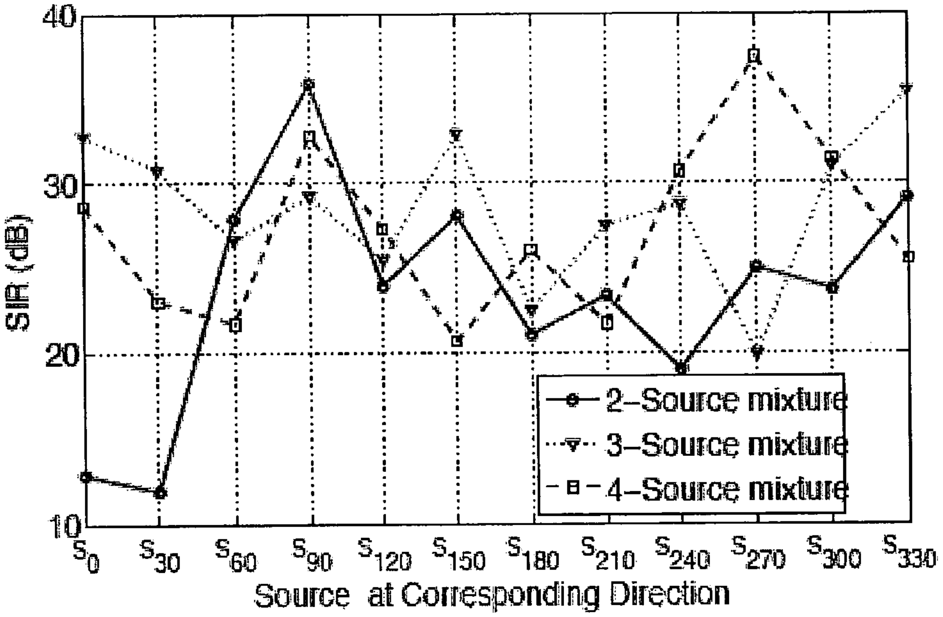
FIG. 16 is a graph showing the signal to interference ratio (SIR) for the separated signals for 2-, 3- and 4-source mixtures at different source positions, as obtained with the system of FIG. 12.

FIG. 16 shows the signal-to-interference ratios (SIR) for each separated source at the corresponding directions for the 2-, 3- and 4-source mixtures. Angular interval between the sources increase with 30° intervals for the 2-source mixtures. For the 3-source and 4-source mixtures, the angular interval is fixed at 120° and 90°, respectively. The separation performance is not affected by the number of sources in the mixture as long as the angular separation between them is large enough.

Figure 17:
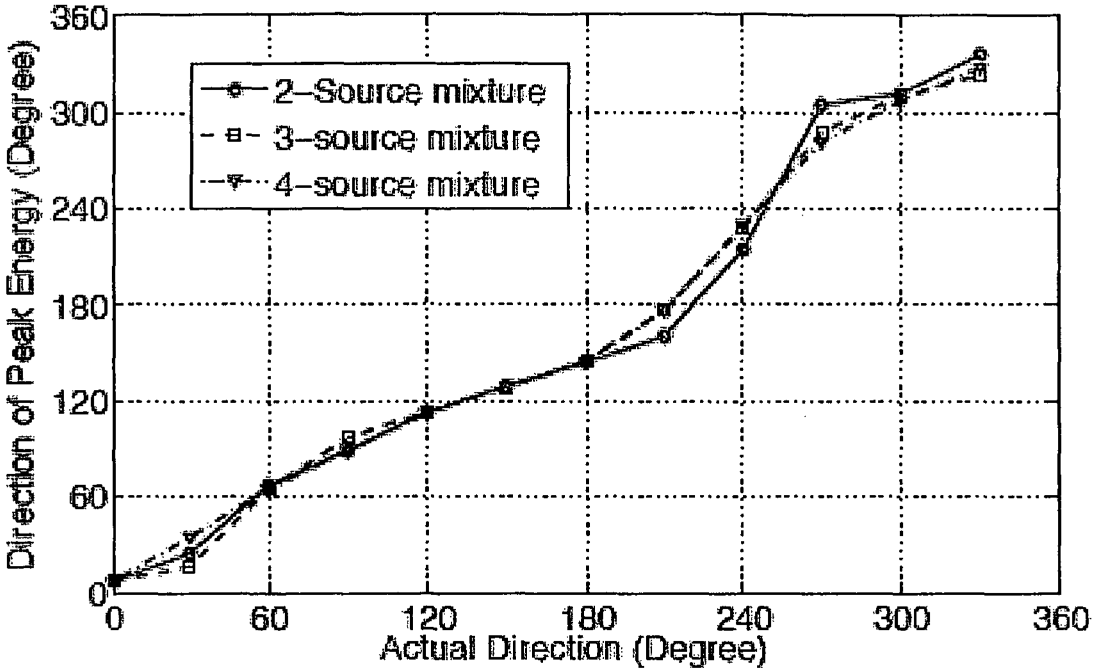
FIG. 17 is a graph showing the relationship between actual source direction and the direction of r.m.s. energy peaks calculated for 2- 3- and 4-source mixtures using the system of FIG. 12.

FIG. 17 shows how the directions of the r.m.s. energy peaks in the reduced dimension data matrix, calculated for the 2-, 3- and 4-source mixtures, vary with actual directions of the sources. As explained above, the discrepancies result from the early reflection in the environment, rather than the number of mixtures or their content.

In order to quantify the quality of the separated signals, the signal-to-distortion ratios (SDR) have also been calculated as described above. For each separated source, the reverberant $p_W(t)$ signal recorded when only that source is active at the corresponding direction was used as the original source with no distortion for comparison. The mean SDRs for the 2-, 3-, and 4-source mixtures were found as 6.46 dB, 5.98 dB, 5.59 dB, respectively. It should also be noted that this comparison based SDR calculation penalises dereverberation or other suppression of reflections, because the resulting changes on the signal are also considered as artifacts. Therefore, the actual SDRs are generally higher.

Due to the 3D symmetry of the tetrahedral microphone array of FIG. 12, the pressure gradient along the z axis, $p_Z(\omega,t)$ can also be calculated and used for estimating both the horizontal and the vertical directions of the intensity vectors.

The active intensity in 3D can be written as:

$$I(\omega, t) = \frac{1}{\rho_0 c}[\mathrm{Re}\{p_W^*(\omega, t)p_X(\omega, t)\}u_x + \mathrm{Re}\{p_W^*(\omega, t)p_Y(\omega, t)\}u_y + \mathrm{Re}\{p_W^*(\omega, t)p_Z(\omega, t)\}u_z] \tag{40}$$

Then, the horizontal and vertical directions of the intensity vector, $\mu(\omega,t)$ and $v(\omega,t)$, respectively, can be obtained by $$\mu(\omega, t) = \arctan\left[\frac{\mathrm{Re}\{p_W^*(\omega, t)p_Y(\omega, t)\}}{\mathrm{Re}\{p_W^*(\omega, t)p_X(\omega, t)\}}\right], \tag{41}$$

$$v(\omega, t) = \arctan\left[\frac{\mathrm{Re}\{p_W^*(\omega, t)p_Z(\omega, t)\}}{[(\mathrm{Re}\{p_W^*(\omega, t)p_X(\omega, t)\})^2 + (\mathrm{Re}\{p_W^*(\omega, t)p_Y(\omega, t)\})^2]^{1/2}}\right] \tag{42}$$

The extension of the von Mises distribution to 3D case yields a Fisher distribution which is defined as $$f(\theta, \phi; \mu, v, \kappa) = \frac{\kappa}{4\pi\sinh\kappa}\exp[\kappa\{\cos\phi\cos v + \sin\phi\sin v\cos(\theta - \mu)\}]\sin\phi, \tag{43}$$

where $0<\theta<2\pi$ and $0<\phi<\pi$ are the horizontal and vertical spherical polar coordinates and $\kappa$ is the concentration parameter. This distribution is also known as von Mises-Fisher distribution. For $\phi=\pi/2$ (on the horizontal plane), this distribution reduces to the simple von Mises distribution.

For separation of sources in 3D, the directivity function is obtained by using this function, which then enables spatial filtering considering both the horizontal and vertical intensity vector directions.

The invention claimed is:

1. A method of separating a mixture of acoustic signals from a plurality of sources, the method comprising:

providing pressure signals indicative of time-varying acoustic pressure in the mixture;

defining a series of time windows; and for each time window:

a) providing from the pressure signals a series of sample values of measured directional pressure gradient;

b) identifying different frequency components of the pressure signals c) for each frequency component defining an associated direction;

d) combining the associated directions of the frequency components to form a probability distribution of the associated directions;

e) modeling the probability distribution so as to include a set of source components each comprising a probability distribution of associated directions from a single sound source;

f) obtaining from the source components a directionality function for a source direction wherein the directionality function defines a weighting factor which is applied to each frequency component and varies as a function of the difference between the source direction and the associated direction of the frequency component; and g) using the directionality function to estimate the frequency components of the acoustic signal from the at least one source direction; thereby h) generating a separated signal for at least one of the sources.

2. A method according to claim 1 including generating from the pressure signals a series of sample values of a pressure function.

3. A method according to claim 2 wherein a directionality function is applied to the pressure function to generate the separated signal for the source.

4. A method according to claim 2 wherein the pressure function is one of: an omnidirectional pressure, an average pressure, and a pressure gradient.

5. A method according to claim 4 wherein the associated direction is determined from the pressure gradient sample values.

6. A method according to claim 1 wherein the directions of the sources are known.

7. A method according to claim 1 wherein the probability distribution is modeled so as also to include a uniform probability density component.

8. A method according to claim 1 wherein the source components are estimated numerically.

9. A method according to claim 1 wherein each of the source components has a beamwidth and a direction.

10. A method according to claim 9 wherein the beamwidth of each of the source components is selected from a set of discrete possible values.

11. A method according to claim 9 wherein the direction of each of the source components is selected from a set of discrete possible values.

12. A method according to claim 1 wherein the directions of the sources are unknown, and the method includes defining a set of possible source directions and, for at least one frequency component, generating, using the directionality function, a directional signal component associated with each of the possible source directions.

13. A method according to claim 12 further comprising generating the separated source signal from the directional signal components.

14. A method according to claim 13 wherein the separated source signal is generated using dimensional reduction of a matrix having the directional signal components as elements.

15. A system for separating a mixture of acoustic signals from a plurality of sources, the system comprising:

at least one sensor arranged to provide pressure signals indicative of time varying acoustic pressure in the mixture; and a processor arranged to define a series of time windows; and for each time window to:

a) generate from the pressure signals a series of sample values of measured directional pressure gradient;

b) identify different frequency components of the pressure signals c) for each frequency component define an associated direction;

d) combine the associated directions of the frequency components to form a probability distribution of the associated directions;

e) model the probability distribution so as to include a set of source components each comprising a probability distribution of associated directions from a single sound source;

f) obtain from the source components a directionality function for a source direction wherein the directionality function defines a weighting factor which is applied to each frequency component and varies as a function of the difference between the source direction and the associated direction of the frequency component and g) use the directionality function to estimate the frequency components of the acoustic signal from the at least one source direction; and thereby h) generate a separated signal for at least one of the sources.

16. A method of separating a mixture of acoustic signals from a plurality of sources, the method comprising:

providing pressure signals indicative of time-varying acoustic pressure in the mixture;

defining a series of time windows; and for each time window:

a) providing from the pressure signals a series of sample values of measured pressure gradient in at least two directions;

b) identifying different frequency components of the pressure signals c) for each frequency component determining an associated direction from the sample values of the pressure gradient;

d) combining the associated directions of the frequency components to form a probability distribution of the associated directions;

e) modeling the probability distribution so as to include a set of source components each comprising a probability distribution of associated directions from a single sound source;

f) obtaining from the source components a directionality function for a source direction wherein the directionality function defines a weighting factor which is applied to each frequency component and varies as a function of the difference between the source direction and the associated direction of the frequency component; and g) using the directionality function to estimate the frequency components of the acoustic signal from the at least one source direction; thereby h) generating a separated signal for at least one of the sources.

* * * * *